Feb. 14, 1950  J. H. DE FREES  2,497,115
TANK TRUCK SUPPORT
Filed Nov. 3, 1945
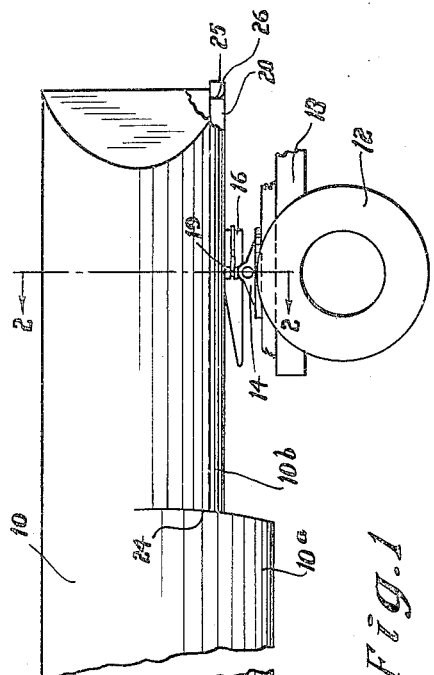
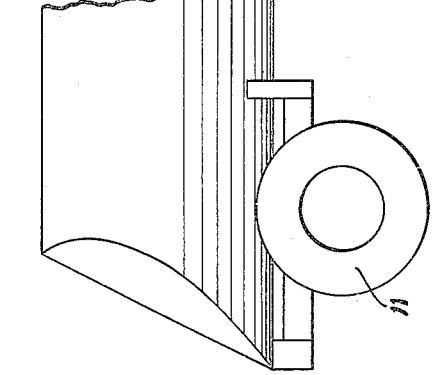
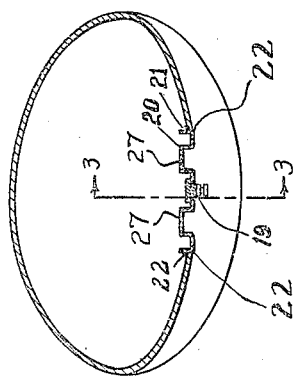
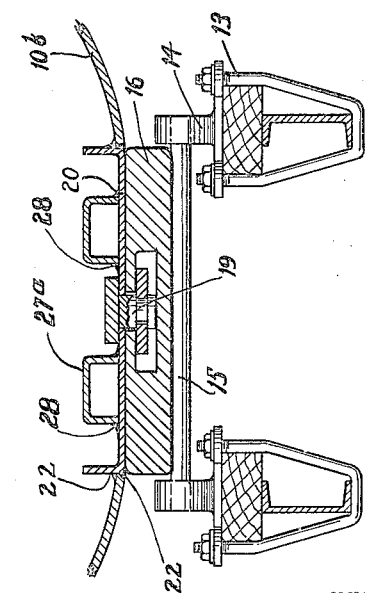
INVENTOR.
JOSEPH H. DE FREES
BY
Hyde and Meyer
ATTY'S ized Feb. 14, 1950

UNITED STATES PATENT OFFICE 2,497,115

TANK TRUCK SUPPORT

Joseph H. De Frees, Warren, Pa., assignor to Pennsylvania Furnace and Iron Company, Warren, Pa., a corporation of Pennsylvania Application November 3, 1945, Serial No. 626,538

3 Claims. (Cl. 280—5)

This invention relates to tank truck supports, with more particular relation to the upper fifth wheel construction.

One object of the invention is to provide an improved tank truck in which the upper fifth wheel parts, instead of being separate members, located below the bottom of the tank and attached to cross bolsters mounted thereon, are embodied as a part of the tank itself and lie at the level of its bottom, without depression, thus increasing the capacity of the tank without increasing its over-all height.

A further object of the invention is to provide an improved tank truck in which the bottom portion or floor of the forward portion of the tank is shaped to provide the upper fifth wheel plate or member, with suitable reinforcement to prevent bending, thus simplifying the construction, reducing the cost, and increasing the carrying capacity.

Still another object of the invention is to provide a truck tank including integrally therewith the upper fifth wheel member, and further including reinforcing members extending longitudinally and not only strengthening the fifth wheel member but also the tank as a whole.

A further object of the invention is to provide an upper fifth wheel for the purpose and of the character described, which avoids any necessity for ramp parts on the upper fifth wheel, and which reduces the liability of breakage or distortion ordinarily resulting from the act of coupling the tractor to the trailer.

Further objects of the invention in part are obvious and in part will appear more in detail hereinafter.

In the drawings,

Fig. 1 represents a side elevational view, somewhat diagrammatic, of a tank truck embodying the invention, parts of the tank being broken out and in section to expose interior parts, and the lower fifth wheel parts being shown conventionally;

Fig. 2 is a cross section on the line 2—2, Fig. 1; the tractor parts being omitted;

Fig. 3 is a detail sectional elevation, on the line 3—3, Fig. 2, but on a larger scale, and also showing parts neighboring the king pin; and Fig. 4 is a detail sectional elevation, on the line 4—4, Fig. 3, and showing a modification.

The tank truck shown in the drawings comprises a tank body, marked generally 10, the rear end of which is supported upon wheels conventionally indicated at 11. The front end is carried upon the wheels 12 of a power tractor of the usual kind, only a portion of which is shown. This tractor is provided with a body or chassis, a part of which is indicated at 13, and on which is mounted a suitable lower fifth wheel element including base members 14 mounted upon the tractor body 13 and upon which is pivotally mounted on the cross shaft or pin 15, a lower fifth wheel member 16 provided with ramp tongues 17 and latching and locking devices conventionally shown at 18 adapted for releasable engagement with the king pin 19. These parts all may be of the usual construction and form no part of the invention.

The tank body 10 usually is of oval contour in cross section, with the longer axis horizontal. The rear part of the tank, marked 10a, is deeper than the forward portion 10b, the latter of which must have its floor at a higher level to accommodate the tractor body and lower fifth wheel.

The tank body is made of sheets or plates of steel rolled or bent to shape and welded together. The king pin is mounted upon an upper fifth wheel member lying at a level below the floor of the tank body and supported upon bolsters.

In the present construction the upper fifth wheel plate is made an integral part of the floor of the forward portion 10b of the tank body, so that the body or shell itself becomes stress-transmitting, in the sense that the stresses and strains of both load and traction are carried by the sheet metal or body itself, rather than by an interior frame or skeleton, and are transmitted from the tractor through the king pin directly to the shell, throughout which they are distributed. In the arrangement shown in Figs. 1 and 2 a portion of the floor of the body, marked 20, constitutes the upper fifth wheel plate member. This member, generally speaking is of shallow channel shape with its side flanges 21 bent upwardly to lie in the tank chamber and extending lengthwise the full length of the forward portion 10b. These flanges reinforce and strengthen the channel portion of the floor and stiffen it against deformation. It is attached to the metal plate or plates forming the body by welding along the bases of the channel flanges, as indicated at the point marked 22, thereby becoming in effect integral with the body wall. At a suitable point the king pin 19 is attached and is welded in place in an opening in member 20, as shown more clearly in Fig. 3, so that, in effect, it is integral with said member. The lower portion of the king pin is provided with the usual annular groove 23 to receive the latching and locking devices 18 before referred to.

The rear end of channeled member 20 is open at the point marked 24 to permit free drainage of liquid from the front portion of the tank into the rear portion when the tank is emptied. At its front end the floor of the channel is bent upwardly to form a cross wall or flange 25, Fig. 1, serving as a buffer or nose presenting a gradually curved surface useful for engagement with the inclined surfaces of the ramps 17 when coupling the truck and trailer together, and avoiding breakage or distortion commonly resulting from impact during this operation. The buffer nose may be reinforced, if desired, by a transverse wall 26 just back of the front end of the fifth wheel plate, as shown in Fig. 1.

Preferably the channel-shaped fifth wheel plate is reinforced against bending, not only to strengthen that portion which provides the fifth wheel bearing surface, where it rests upon the lower fifth wheel member 16, as shown in Fig. 3, and better enable it to withstand tractive strains and stresses transmitted to it through the king pin, but also to strengthen and stiffen the full length of the floor of the front body portion 10b, as will be readily apparent. This may be accomplished in any suitable manner. Fig. 2 illustrates the channel as having its horizontal plate portion bent upwardly, on either side of the central longitudinal line, to form a pair of spaced, parallel, longitudinally extending upwardly bent ribs or channel members 27. These are integral with the metal of the plate itself, which in a way may be described as corrugated with the corrugations extending longitudinally. However, the reinforcing ribs may be made integral parts of the upper fifth wheel plate member in the manner shown in Fig. 4, where supplemental channels 27a having their flanges extending downwardly, are laid in place upon the channel 20 and have the edges of their depending flanges welded to it, as indicated at 28.

With my construction cross bolsters and a separate depressed or low hanging upper fifth wheel plate are unnecessary. The upper fifth wheel plate is a part of the floor of the tank body itself. No interior structural steel skeleton or frame is required or necessary, and the load is supported by the tank body itself, including of course the integral upper fifth wheel plate member of my invention. Said plate member carries the king pin and when the truck and trailer are coupled, a relatively wide area bearing surface of said member rests directly upon the lower fifth wheel member carried by the tractor. Bending may be prevented either by using a plate of sufficient thickness to require no reinforcement or by using any of the reinforcements described, instances of which are shown in Figs. 2 and 4. The arrangement provides better load distribution and facilitates compliance with road laws which limit the maximum carrying capacity for each axle. The dead weight is especially reduced, which not only further reduces the cost, but also increases the pay load which is limited only by regulations respecting gross weight. At the same time the construction provides an improved appearance.

Further advantages of the invention will be apparent to those skilled in the art.

What I claim is:

1. A chambered tank body for liquid transporting trucks, comprising metal sheets welded together to form an elongated stress transmitting body of generally cylindrical cross section, the forward portion of the body being shallower than the rear portion and including a floor formed by such metal sheets and extending in a horizontal plane at a level above the floor of the rear body portion, said front body floor having an integral depending king pin and a portion surrounding the king pin and extending horizontally in said plane in all directions from the pin and which floor portion forms an upper fifth wheel member integral with the tank body and presents downwardly a bearing surface of relatively wide area adapted to rest upon and distribute weight of the body and load over the full area of the lower fifth wheel member of a tractor to which the body is connected by its king pin, the upper fifth wheel member also serving to directly transmit tractive strains and stresses from the king pin to the tank body.

2. A chambered tank body for liquid transporting trucks, comprising metal sheets welded together to form an elongated stress-transmitting body of generally cylindrical cross section, the forward portion of the body being shallower than the rear portion and including a floor formed by such metal sheets and extending in a horizontal plane at a level above the floor of the rear body portion, said front body floor having an integral depending king pin and a portion surrounding the king pin and extending horizontally in said plane in all directions from said pin and which floor portion forms an upper fifth wheel member integral with the tank body and presents downwardly a bearing surface of relatively wide area adapted to rest upon and distribute weight of the body and load over the full area of the lower fifth wheel member of a tractor to which the body is connected by its king pin, that portion of the metal sheets which serves as the upper fifth wheel member being of generally channel form with its wide web forming the floor of the front body portion and having integral opposite parallel edge flanges which extend upwardly into the chamber of the body and reinforce the upper fifth wheel member against tractive strains and stresses transmitted to it through the king pin.

3. A chambered tank body for liquid transporting trucks, comprising metal sheets welded together to form an elongated stress-transmitting body of generally cylindrical cross section, the forward portion of the body being shallower than the rear portion and including a floor formed by such metal sheets and extending in a horizontal plane at a level above the floor of the rear body portion, said front body floor having an integral depending king pin and a portion surrounding the king pin and extending horizontally in said plane in all directions from said pin and which floor portion forms an upper fifth wheel member integral with the tank body and presents downwardly a bearing surface of relatively wide area adapted to rest upon and distribute weight of the body and load over the full area of the lower fifth wheel member of a tractor to which the body is connected by its king pin, that portion of the metal sheets which serves as the upper fifth wheel member being of generally channel form with its wide web forming the floor of the body portion and having integral opposite parallel edge flanges and being also provided with parallel longitudinally extending ribs lying between said flanges, both the flanges and the ribs extending upwardly into the chamber of the body and reinforcing the upper fifth wheel member against tractive strains and stresses transmitted to it through the king pin.

JOSEPH H. DE FREES.

REFERENCES CITED

The following references are of record in the file of this patent:

UNITED STATES PATENTS

| Number | Name | Date |
| --- | --- | --- |
| 1,902,849 | Gredell | Mar. 28, 1933 |
| 2,036,607 | Robinson | Apr. 7, 1936 |
| 2,056,262 | Edwards | Oct. 6, 1936 |